US008333656B2

(12) United States Patent
Vaughan

(10) Patent No.: US 8,333,656 B2
(45) Date of Patent: Dec. 18, 2012

(54) GAMING SYSTEM

(75) Inventor: Kenneth L. Vaughan, Warrawong (AU)

(73) Assignee: Lions Share (Aust) Pty Ltd, New South Wales (AU)

( * ) Notice: Subject to any disclaimer, the term of this patent is extended or adjusted under 35 U.S.C. 154(b) by 0 days.

(21) Appl. No.: 13/062,650

(22) PCT Filed: Aug. 4, 2009

(86) PCT No.: PCT/AU2009/000988

§ 371 (c)(1),
(2), (4) Date: May 10, 2011

(87) PCT Pub. No.: WO2010/015021

PCT Pub. Date: Feb. 11, 2010

(65) Prior Publication Data

US 2011/0223992 A1 Sep. 15, 2011

(30) Foreign Application Priority Data

Aug. 4, 2008 (AU) ................................ 2008903966

(51) Int. Cl.
*G06F 17/00* (2006.01)

(52) U.S. Cl. ........................................................ 463/27

(58) Field of Classification Search ............... 463/16–27
See application file for complete search history.

(56) References Cited

U.S. PATENT DOCUMENTS

| | | | | |
|---|---|---|---|---|
| 6,206,782 | B1 * | 3/2001 | Walker et al. | 463/25 |
| 6,503,146 | B2 * | 1/2003 | Walker et al. | 463/25 |
| 7,637,811 | B2 * | 12/2009 | Walker et al. | 463/25 |
| 8,043,152 | B2 * | 10/2011 | Walker et al. | 463/16 |
| 2003/0036429 | A1 | 2/2003 | Witty et al. | |
| 2003/0109307 | A1 | 6/2003 | Boyd | |
| 2004/0198487 | A1 | 10/2004 | Schneider | |
| 2006/0160620 | A1 | 7/2006 | Matthews et al. | |
| 2007/0060314 | A1 | 3/2007 | Baerlocher et al. | |
| 2007/0117608 | A1 | 5/2007 | Roper et al. | |
| 2011/0092277 | A1 * | 4/2011 | Jaffe et al. | 463/27 |

FOREIGN PATENT DOCUMENTS

| | | |
|---|---|---|
| AU | 765084 | 9/2003 |
| WO | WO-2005/029220 | 3/2005 |
| WO | WO-2005/107899 | 11/2005 |
| WO | WO-2008/005366 | 1/2008 |

* cited by examiner

*Primary Examiner* — Ronald Laneau
(74) *Attorney, Agent, or Firm* — Connolly Bove Lodge & Hutz LLP

(57) ABSTRACT

A gaming system (1) comprising an electronic gaining machine (5) having an associated players station interface device (4) configured to monitor the turnover of the electronic gaming machine (5) and having an interface device display (7) configured to display an interface device electronic game such that a predetermined proportion of the electronic gaming machine turnover is pulled into an interface device electronic game jackpot controlled by a control server (2) in communication with the player station interface device (4) wherein an electronic trigger is sent from the control server (2) to the player station interface device (4) to commence an interface device game and wherein the control server (2) is configured to provide a payout for a user winning the interface device game.

58 Claims, 4 Drawing Sheets

GAMING SYSTEM

CROSS REFERENCE TO RELATED APPLICATIONS

This application is a National Phase filing under 35 U.S.C. §371 of PCT/AU2009/000988 filed on Aug. 4, 2009; and this application claims priority to Application No. 2008903966 filed in Australia on Aug. 4, 2008 under 35 U.S.C. §119; the entire contents of all are hereby incorporated by reference.

FIELD OF THE INVENTION

The invention relates to a gaming system and, in particular, to a linked progressive jackpot gaming system.

The invention has been developed primarily to provide players of electronic gaming machines an additional gaming experience and will be described hereinafter with reference to this application. However, it will be appreciated that the invention is not limited to this particular field of use.

BACKGROUND ART

Gaming systems and in particular electronic gaming machines have been extensively developed over recent decades. There remains a continuing desire for gaming machine operators to attract new players to their machines and also to retain the interest of existing and valued players. A large number of different types of games have been developed for these purposes. Additionally, linked jackpot systems were introduced at least in part for this purpose.

Linked jackpot gaming systems are systems which are connected to a plurality of electronic gaming machines. The electronic gaming machines can be in the same venue or be spread over some area, for example a state. A percentage of the turnover of each electronic gaming machine in the system is pooled and a jackpot pool is distributed to any winning electronic gaming machines. The linked jackpot systems are operated over the top of/in dependence with the operation of an electronic gaming machine.

These linked jackpot systems have been used for a sufficient period of time that electronic gaming machine players are familiar with the concept. Players have come to associate various actions with the playing of linked jackpot systems such as commencing play on such systems once a pooled jackpot reaches some level where the player believes there is a higher likelihood that the linked jackpot will be won. Whilst these players are comfortable with such use, other players who prefer not to commence playing once the jackpot reaches a certain level, do not see appeal in the linked jackpot systems.

The disclosure of Australian Patent Application No. 2004242434 attempts to provide a system to reward loyal players. This disclosure provides an interactive player display system mounted to or adjacent to an electronic gaming machine. The interactive player display is configured to function integrally with the electronic gaming machine which both communicate to a computer server for operating the electronic gaming machine and interactive user display, as well as to store electronic gaming machine transaction information and player tracking data.

Unfortunately, this prior art system is a card based system requiring the establishment of a player's bona fides. Each player is assigned a card and an associated account which is maintained on the networked computer. Before playing an electronic gaming machine, the player must insert their card so as to accumulate points proportional to the play of the electronic gaining machine so as to accrue points in their account. The points are then redeemable by the player for additional play, products, services, etc.

The accumulated points and player account are governed by a bank controller which essentially monitors and controls the player tracking and can additionally provide cashless gaming services. The players' registration cards can be used on a plurality of machines as the interactive display system of this prior art is integral with the networked operation of the electronic gaming machine. The interactive player display additionally provides the advantage to players of being able to order attendant service, food or beverages. In this prior art system, an electronic gaming machine can be played without a player registration card, however, no benefits of the system are then provided.

GENESIS OF THE INVENTION

The genesis of the invention is a desire to provide a gaming system to attract electronic gaming machine players or to retain existing players' interest, or to provide a useful alternative.

SUMMARY OF THE INVENTION

According to an aspect of the invention there is provided a gaming system comprising:

a control server;

a player station interface device configured to be associated with an electronic gaming machine and monitor turnover thereof and communicate the turnover to the control server;

an interface device display configured to display an interface device electronic game;

wherein a predetermined percentage of the electronic gaming machine turnover is pooled into an interface device game jackpot controlled by the control server which generates an electronic trigger for the interface device to commence an interface device electronic game, and the interface device provides a payout of part or all of the interface device game jackpot to the user of the interface device if they win the interface device game.

According to another aspect of the invention there is provided a gaming system comprising an electronic gaining machine having an associated players station interface device configured to monitor the turnover of the electronic gaming machine and having an interface device display configured to display an interface device electronic game such that a predetermined proportion of the electronic gaming machine turnover is pulled into an interface device electronic game jackpot controlled by a control server in communication with the player station interface device wherein an electronic trigger is sent from the control server to the player station interface device to commence an interface device game and wherein the control server is configured to provide a payout for a user winning the interface device game.

It can therefore be seen that there is provided a server based integrated progressive jackpot system operating independently of any electronic gaming machine operation to provide an interface device game as an enticement to new electronic gaming machine players or as an appeal to existing gaining machine players. Furthermore, the system allows a player the opportunity to choose a jackpot level to play for.

BRIEF DESCRIPTION OF THE DRAWINGS

Preferred embodiments of the invention will now be described, by way of example only, with reference to the accompanying drawings in which.

DETAILED DESCRIPTION

Figure 1:
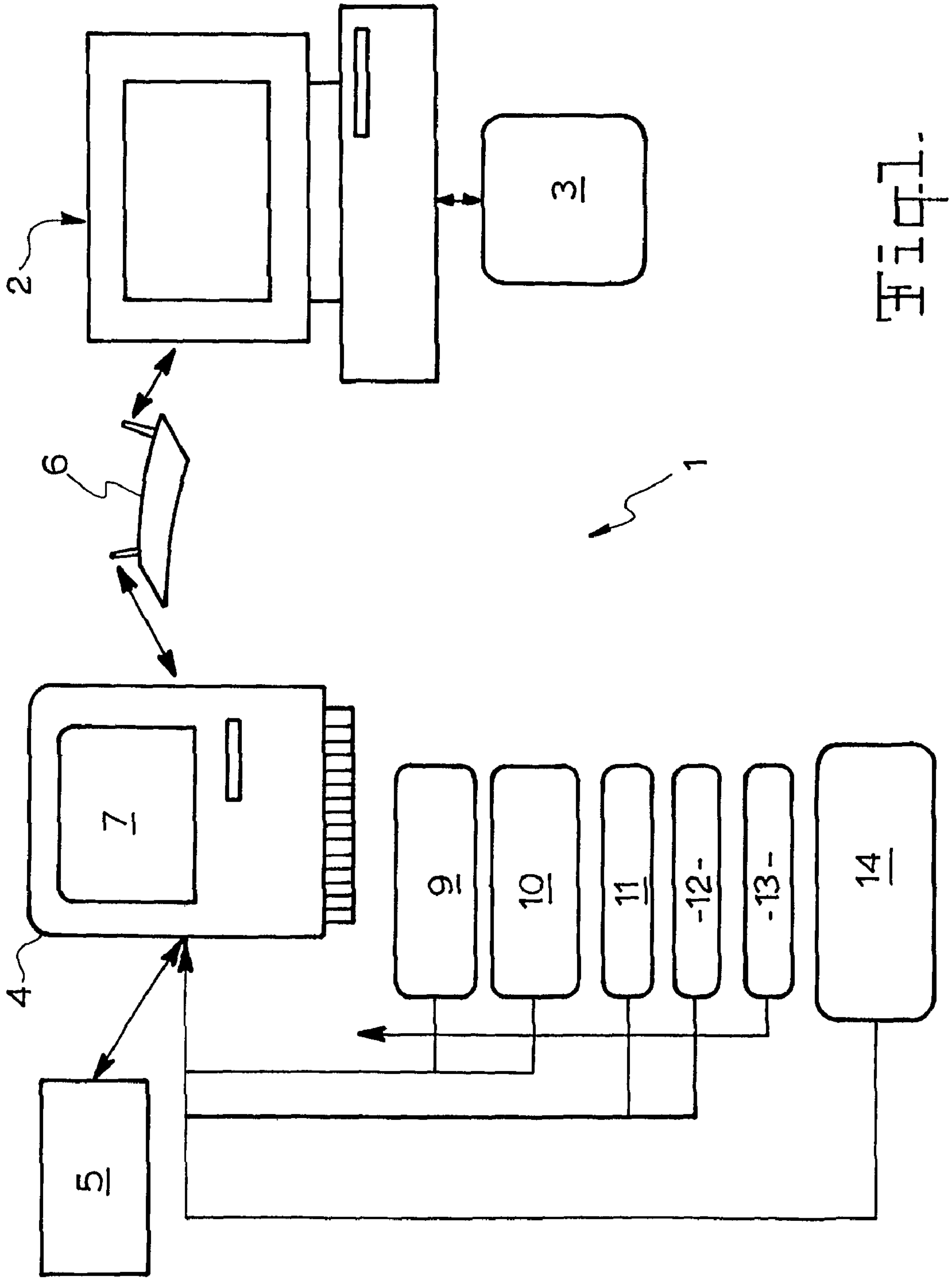
FIG. 1 is a block diagram of a gaming system according to a first preferred embodiment.

Throughout the description of the preferred embodiments of the invention like reference numerals have been used to denote like components unless stated to the contrary.

Referring to FIG. 1, there is shown a block diagram of a gaming system 1 in accordance with a first preferred embodiment. The gaming system 1 includes a control server 2 in communication with a server database 3. A player station interface device 4 is associated with an electronic gaming machine 5. The electronic gaming machine 5 can be any preferred machine of any preferred type and configured to provide any preferred type of graphics display. Further, the electronic gaming machine 5 can be configured to play any preferred type of gaming machine game.

The interface device 4 is in read-only communication with electronic gaming machine data outputs (not illustrated), however, in other preferred embodiments the interface device is not read only associated with the electronic gaming machine 5 and it can be configured to send data to the electronic gaming machine 5 such as to interconnect the credit meters. The interface device 4 only monitors the electronic gaming machine 5 turnovers and communicates this to the control server 2 wirelessly via a wireless router 6. Although not illustrated, the interface device 4 receives its power from the electronic gaming machine 5, however, any preferred power source can be employed. It will be appreciated that in other embodiments (not illustrated) the interface device 4 can be in communication with the control server 2 by cable connection.

The player station interface device 4 includes a display 7 configured to display an interface device electronic game.

A predetermined percentage of the electronic gaming machine 5 turnover is pooled into an interface device game jackpot controlled by the control server 2. That is, the control server 2 administers an interface device game on the interface device 4. The control server 2 generates an electronic trigger string for the interface device 4 to commence an interface device electronic game displayed on the interface device display 7. As noted, the interface device game can be a game of skill or chance, and be any preferred type of electronic game.

The interface device provides a payout of part or all of the interface device game jackpot to the user of the electronic gaming machine 5 associated with the player station interface device 4 should the interface game be won by the player.

In the preferred embodiment of FIG. 1, the interface device 4 communicates with the control server 2 over a wireless network. In this preferred embodiment, a TCP/IP WLAN network is employed. This wireless network uses encrypted internet protocol and provides a means of two-way communication between each interface device 4 and the control sewer 2. It will be appreciated, however, that any preferred communications protocol can be used such as IPX, Appletalk or other non-serial communications protocol. The wireless network formed between the interface device 4 and the control server 2 is a secured wireless network. Further, it will be appreciated that the control server 2 can be in communications with each interface device 4 via internet or intranet communications.

The player station interface device 4 includes user input means in the form of a touch pad, a player recognition means 10 and a card reader 11 should any user of the associated electronic gaming machine 5 wish to have their playing status tracked by the control server 2. The interface device 4 also includes output means for communication via a printer 12 and pager 13. Other ancillary devices 14 can be added to the interface 4 as desired.

The touch pad 9 is configured to receive input from the user when making a selection on the display 7. It will be appreciated that any preferred input means such as touch screens, for example, can be employed as desired to receive user input into the gaming system 1. It will also be appreciated that external memory devices, smart card readers, biometric security identification means, for example, can be interfaced with the player station interface device 4.

The electronic trigger string (not illustrated) generated by the control server 2 and communicated to the interface device 4 is randomly generated. The electronic trigger includes data indicative of the jackpot amount available to be won by the interface device 4 by the player of the associated electronic gaming machine device 5 in response to wining the interface device game triggered by the electronic trigger string.

In the gaming system 1, the graphics and audio elements 1 associated with the interface device game are stored locally on the interface device and are actuated in response to data contained in the electronic trigger string. In the gaming system 1, the operation and display of the interface device 4 can be dynamically controlled by the control server 2. This includes the dynamic allocation of types of games to be displayed and played including updated graphical and audio information associated with the operation of the interface device 4.

In use, the player of an electronic gaming machine 5 has the player station interface device 4 associated with it. Although not illustrated, the interface device 4 can be integrated into the electronic gaming machine 5 enclosure, it may be mounted to the electronic gaming machine 5 or be disposed adjacent to it within sight of the electronic gaming machine player.

In response to receipt by the interface device 4 of the electronic trigger string generated by the control server 2, the interface device game is displayed on the interface device display 7. The interface device game may or may not involve user input in order for the game to be played. In response to winning the interface device game, a payout corresponding to the interface device jackpot or part thereof is available for the player. The payout can be dispensed by the interface device printer 13 in the form of a ticket or token to be redeemed, or it may alert an attendant to provide service. Of course, electronic data indicative of the amount of the interface device jackpot to be collected by the player upon winning the interface device game can be sent electronically to a cashier or the like for collection by the player.

It can therefore be seen that there is advantageously provided a player station interface device 4 which offers a game for playing independent of game play of the electronic gaining machine 5 in which to reward a player. In this way, players are offered another opportunity to win via the interface device jackpot in addition to payouts from the electronic gaming machine 5 which advantageously increases interest in use of the electronic gaming machine 5 players and also provides opportunity to attract new players.

Figure 2:
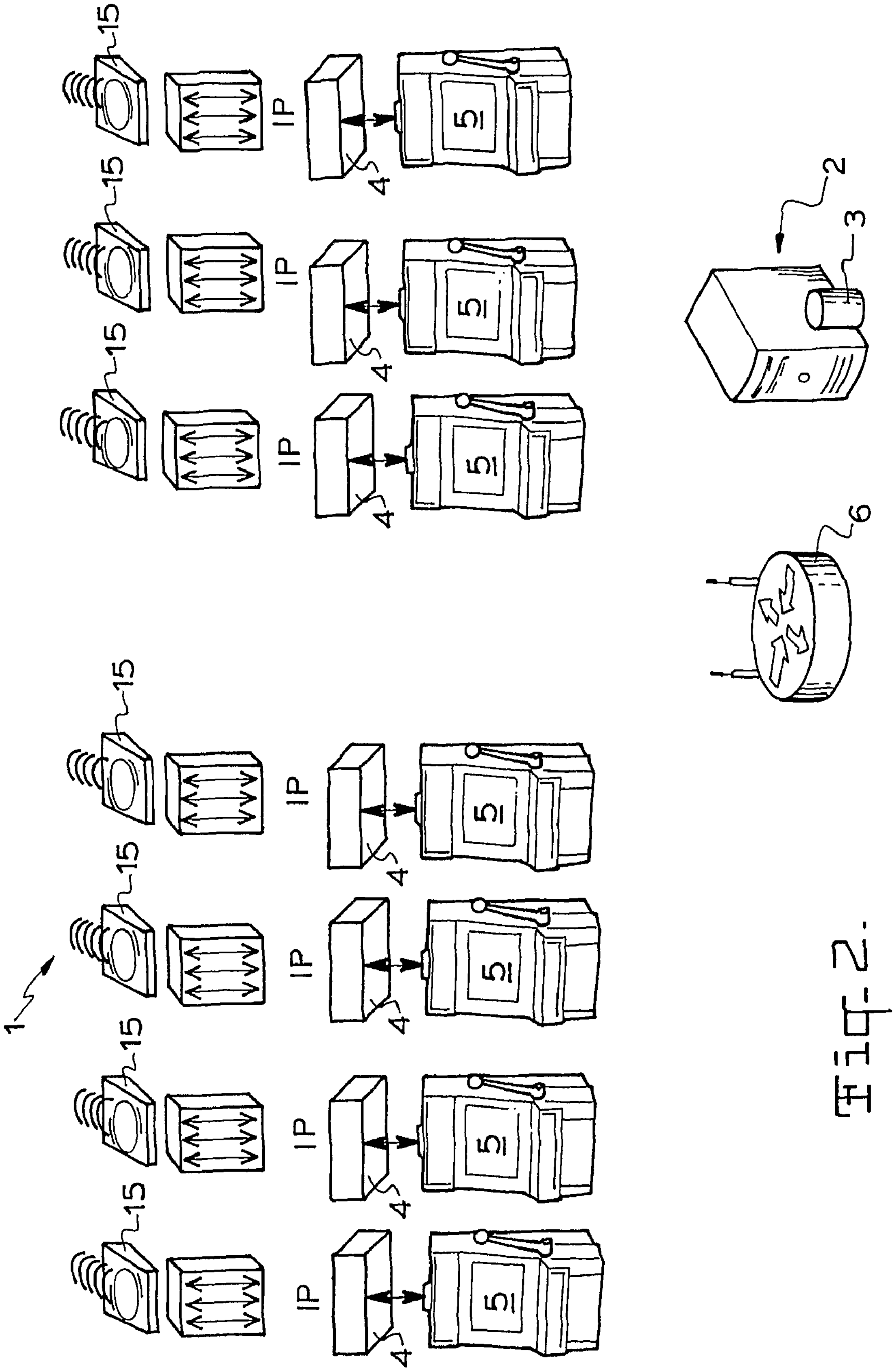
FIG. 2 is a schematic diagram of a gaming system according to a second preferred embodiment.

Referring now to FIG. 2, there is shown a schematic diagram of a gaming system 1 according to a second preferred embodiment of the invention. The system 1 of this embodiment includes a plurality of electronic gaming machines 5 each having associated with it a player station interface device 4 which communicates wirelessly to a router 6 via a wireless transmitter receiver 15 to the control server 2.

Each of the plurality of electronic gaming machines 5 operate independently of the operation of the associated player station interface devices 4. The control server sends the electronic trigger string to the interface device or devices 4 to commence the interface device game randomly but may equally determine which device or devices 4 commence the interface game as a function or in proportion to the continuous time of play of an electronic gaming machine 5 associated with interface device 4, as a function of the turnover of the associated electronic gaining machine 5, or as a function of a favoured player status for players having been identified by the interface device by the card reader 11 (or other preferred means) of an associated electronic gaining machine 5. Broadly speaking, the interface device or devices 4 eligible to play the interface device game are dynamically allocatable by the control server 2.

In the embodiment of the gaming system 1 shown in FIG. 2, the interface device game jackpot commences at a predetermined minimum value and increments by the predetermined percentage of the turnover of each electronic gaming machine 5. The control server 2 is configured to generate the electronic trigger string to one or more interface devices 4 to commence the interface device game prior to the interface device jackpot exceeding a predetermined maximum value.

The display 7 of each player station interface device 4 is configured to display a second level interface device electronic game for a second level interface device game jackpot that is formed from a percentage of the interface device jackpot, or that is formed from a second level predetermined percentage of the electronic gaming machine 5 turnover. As with the determination of which interface device or devices 4 commence an interface device game, the control server 2 determines which device or devices 4 commence the second level interface device game. This can be randomly, as a function of continuous time of play of the associated electronic gaming machine 5, as a function of the turnover of the associated electronic gaming machine 5, or as a function of the favoured player status of those players identified by the interface device or devices 4.

The second level interface device game is commenced by winning the interface device game. However, it will be appreciated that the second level interface device game can be actuated on one or more devices 4 in response to a second level electronic trigger string generated by the control server 2. The control server 2 can determine which device or devices 4 commence the second level interface device game as preferred similarly to that of the interface device game The second level interface device game jackpot commences at a predetermined minimum value and increments by the predetermined percentage of the interface device jackpot or by the percentage of turnover of each electronic gaming machine. The control server is configured to generate the second level electronic trigger to one or more interface devices to commence a second level interface device game before the second level interface device jackpot exceeds a predetermined maximum value. The second level interface device game may be independent of the operation of the interface device game.

As with the embodiment of FIG. 1, any winning payout can be made to a player via tokens dispensed by the interface device, or otherwise. However, in this embodiment, the payout may also be transferred to the electronic gaming machine whereby the interface device 4 can have two-way communications with the electronic gaming machine 5 (as noted above) so as to be able to deposit credit in the electronic gaming machine credit meter 5 corresponding to a payout of a winning jackpot of an interface device jackpot or a second level interface device jackpot.

That is, the interface devices 4 can read all data generated by the associated electronic gaming machines 5, and can also write data to the machines 5. For example, the interface devices 4 can read all data generated by the associated electronic gaming machine 5 and can write to or adjust the electronic gaming machine credit meter.

In the embodiment of FIG. 2, the display 7 of each interface device 4 is configured to display a third, fourth or higher level or levels interface device game to be played for a third, fourth or higher level(s) interface device jackpot formed from a percentage of one or more preceding level interface device jackpots, or formed from a third, fourth or higher level predetermined percentage of the electronic gaming machine 5 turnover. The third, fourth or higher level interface device games are commenced by winning a preceding level interface device jackpot, or independently of the preceding level game in response to a third, fourth or higher level electronic trigger string generated by the control server 2. The control server 2 can make the determination which interface device or devices 4 commence a third, fourth or higher level game randomly, as a function of continuous time of play of an associated electronic gaming machine 5, as a function of the turnover of an associated electronic gaming machine 5, or as a function of a favoured player status of a player identified by the interface device 4.

For example, as the player of an electronic gaming machine 5 turns over so much money per period of time then they will qualify to receive an electronic trigger string which makes the player of the electronic gaming machine 5 eligible for other or higher levels of interface device game jackpots as the turnover reaches predetermined amounts. The third, fourth, higher level device game jackpots commence at a predetermined minimum value and increment by the third, fourth or higher level predetermined percentage of the turnover of the associated electronic gaming machine or machines 5, or by a predetermined percentage of a preceding level interface jackpot. The control server 2 is configured to generate third, fourth or higher level electronic trigger strings to one or more of the interface devices 4 to commence the third, fourth or higher level interface device games before the third, fourth or higher level interface device jackpots exceed a predetermined maximum value. That is, the interface device games can have shared jackpots and cascading price pool structures.

It will be appreciated that in preferred embodiments, the player of an electronic gaming machine 5 can select which progressive link jackpot level they wish to play for on the associated interface device 4. This advantageously provides an opportunity to play higher level jackpot games than they may have otherwise been able potentially making a difference to whether a player plays or not.

It will be appreciated that the interface device game, and interface device second, third, fourth or higher level games can be configured remotely by the control server 2 including any updates to the games or modifications to the graphics and any audio.

In this embodiment, one or more of the interface devices 4 are configured to each substantially simultaneously play an interface device game. This can be achieved by remotely storing the game data on each interface device 4 and merely using the control server 2 to trigger the playing of the game.

It will be appreciated that the game data can alternatively be stored on a server 2 if desired.

Furthermore, users of one or more interface devices 4 can share in the interface device jackpot associated with an interface device game. In the case where an interface device game jackpot is not won by a user, the amount may jackpot or be rolled into a higher level interface game or alternatively, the amount may jackpot or be shared among multiple users of interface devices 4 winning a substantially simultaneously played interface device game.

It will be appreciated that the interface device game or second or subsequent level interface device games may require input or not. For example, they may merely be a form of bingo which displays numbers with randomly generated numbers to match one distributed to players, or be in the form of a sporting race with pre-allocated players or a table game with no choice of selection. Alternatively, the interface device games may require user input and may be in the form of a bingo or lotto where numbers are selected, or the form of a race or sporting game where one or more contestants are chosen or is a table game where the user selects cards. That is, the interface device games can be games of chance, probability or skill. Table games or any other preferred types of game may also be played as interface device games.

It will be appreciated that one or more interface devices 4 and associated electronic gaming machines 5 can be grouped so that each group displays the grouped interface device game or games and their associated jackpot amounts as well as preferably the number of other interface devices 4 participating in the interface device game or games.

Figure 3:
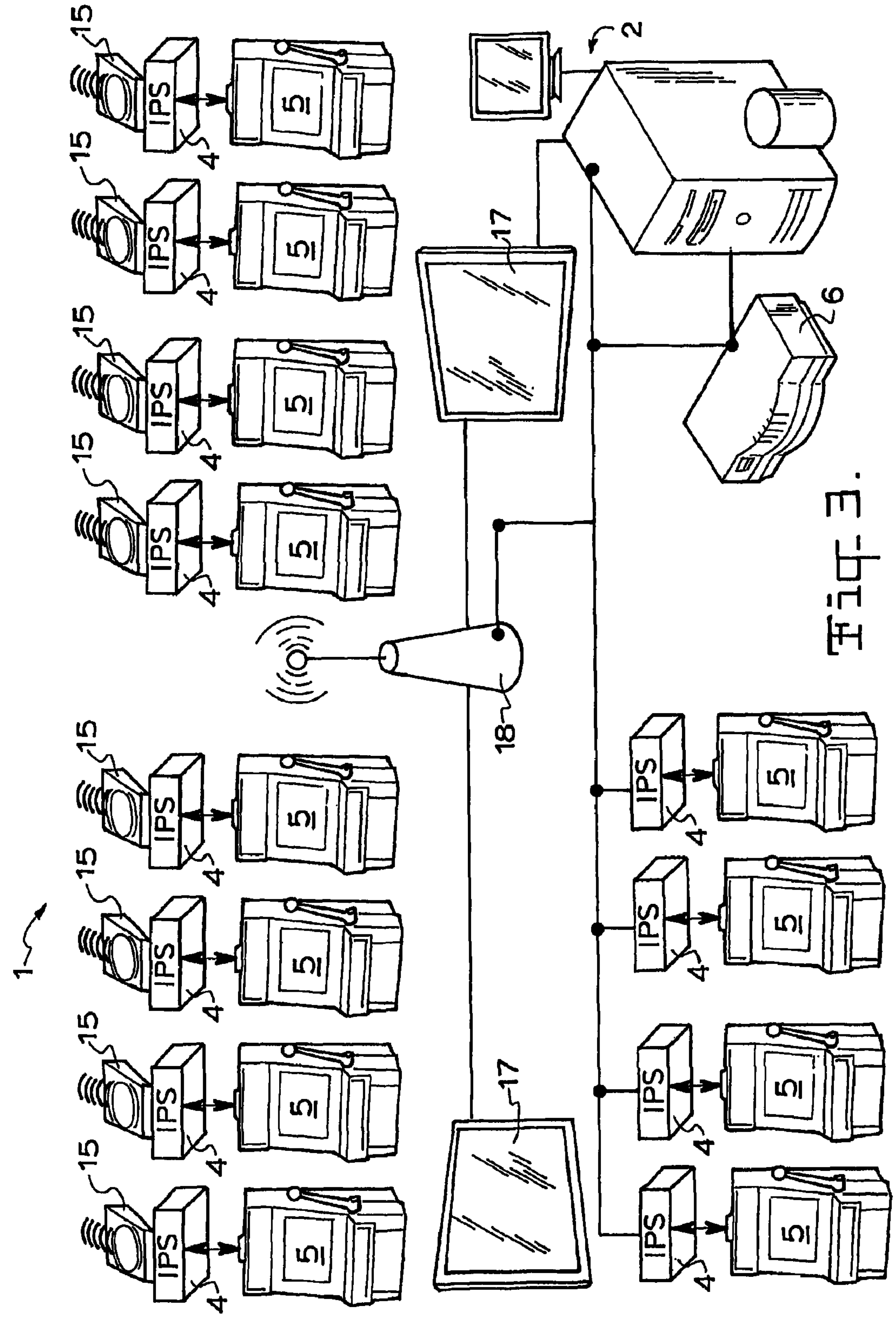
FIG. 3 is a schematic block diagram of a gaming system according to another preferred embodiment.

Turning to FIG. 3 there is shown another preferred embodiment of the gaming system 1. In this embodiment some interface devices 4 are connected to the router 6 by means of a wireless link via a wireless access receiver transmitter 18 and other interface devices 4 are connected via a cabled network. Additional visual display units 17 configured for viewing by other people are provided in or around the areas of the electronic gaming machines 5, or elsewhere. The additional display units 17 can be disposed in an electronic gaining machine top box, for example. The additional display units 17 can display information indicative of the interface device game or games being played for by a user or group of users, or displaying all interface games and information about them such as jackpot level and which electronic gaming machine players are playing. It will be appreciated any preferred information, including advertising or promotional material, can be provided on any one or more of the additional visual display units 17.

Figure 4:
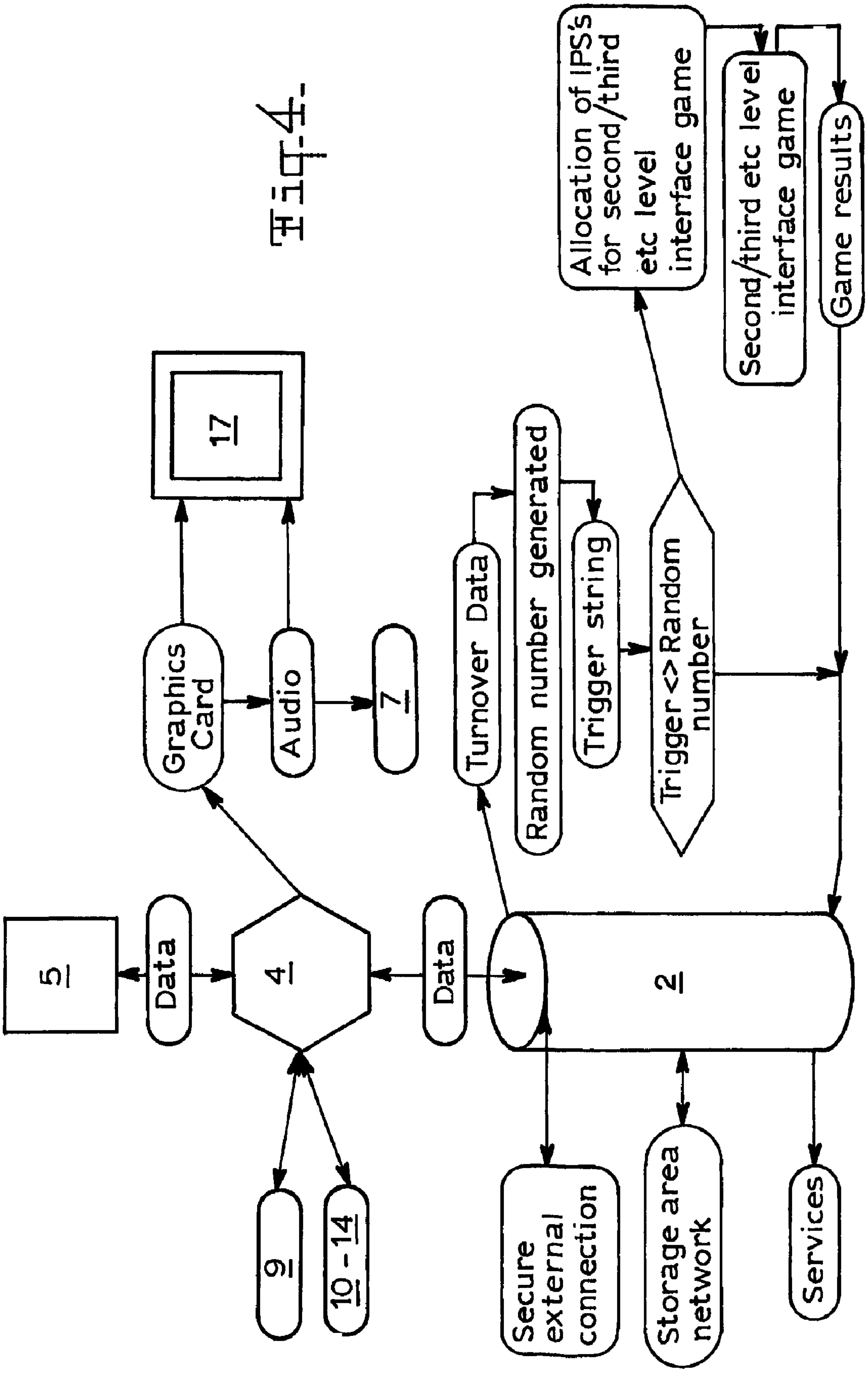
FIG. 4 is a block diagram of the data flow of the gaming system of FIG. 3.

In FIG. 4, there is shown a block diagram of data flow of the gaming system 1 of the third preferred embodiment of FIG. 3.

It will be appreciated that the interface device game or games can be commenced in response to a control server 2 generated electronic trigger string as desired if in addition to the conditions described above. In other embodiments of the invention, not illustrated, an electronic gaming machine user may select to be eligible for inclusion in an interface device game or games by means of providing user input to an associated interface device 4. Furthermore, it will appreciated that the gaming system 1 can be configured to allow a player to select an interface device game or other level interface device game to compete for and to apportion the predetermined percentage or percentages of the electronic gaming machine 5 turnover to the selected interface device game jackpot or jackpots.

In one preferred embodiment of the invention (not illustrated), the gaming system 1 provides an interface device game jackpot as well as second, third and fourth level interface device jackpots operating on a plurality of electronic gaming machines 5. When a player commences play on an associated electronic gaming machine 5, the user may input into the interface device 4 which jackpot level or levels they wish to be eligible to play for. The display 7 of each interface device 4 displays the value of the jackpot prizes and shows the number of machines competing for a particular jackpot level. As noted above, this information can the displayed on one or more additional display units 17.

If the player does not select which jackpot level or levels to play for, their percentage turnover contribution will go to the interface device game having the lowest percentage incremental jackpot level, such as the interface device game jackpot. It will, also be appreciated that the interface device can "lime-out" a player's participation in the interface device game or games if the turnover of the associated electronic gaming machine 5 drops below a predetermined amount or if the turnover ceases for longer than a 'hold' predetermined period of time. That is, if the player does not play within some predetermined period, for example 3 or 5 minutes and the interfaces 4 are fully subscribed; the player vacates their position in relation to the (allocated or chosen) interface game.

In such an embodiment, the player selection would work in all electronic gaming machines 5 and contribute to all the jackpot levels with the major contribution going to the level selected but a small contribution also going to the other levels. In other preferred embodiments (not illustrated) the contributions going to the levels other than the selected level can be chosen to be any preferred value including zero.

In the ease of four levels in this non-illustrated embodiment, the first level or interface device game jackpot may operate in the range $9,000 to $10,000. The second level interface device genie operates in a range of $4,000 to $5,000, the third level interface device game operates in a jackpot range of $450 to $500 and the fourth level operates in the jackpot level $100 to $150. Of course, any preferred number of levels of interface device game can be provided.

In an example where a gaming venue allocates 2% of the turnover of each electronic gaming machine 5 to the interface device jackpots of the gaming system 1 then the system may increment 0.25% per jackpot level for all jackpot levels. The selected level could increment an extra 1% so that the player's selected jackpot could increment by an extra 1.25% providing a greater incentive to win that jackpot level.

This not only attracts new players and retains the interest of existing players, but when one interface device jackpot increases it also increases the other jackpot levels, making the other jackpot levels more attractive after one level goes off. Furthermore, players do not need to change from electronic gaming machine to electronic gaming machine when a jackpot level goes off as they can stay on an electronic gaming machine 5 and play for the next jackpot level. Thus the venue does not necessarily have machine downtime when a prize level is won as the player can advantageously just change their jackpot level selection. This may have the advantageous result of decreased capital expenditure due to the lack of electronic gaming machine downtime.

In an alternative embodiment of the invention (not illustrated), jackpot prizes can be based on player loyalty so that the jackpots can be awarded to players based on their turnover relative to the turnover of other players. The generation by the control server 2 of the electronic trigger string includes data in the trigger string indicative of a weighting of each electronic gaming machine's contribution to the jackpot. For example, if an electronic gaming machine player turns over ten times the value of another player the electronic trigger string is weighted to increase the chance of one player being selected for the interface device game or games with a ten times greater frequency.

In this embodiment assume, for example, there are thirteen electronic gaming machine players playing for the gaming system 1. The electronic trigger string generated by the control server 2 would comprise data indicative of the differing turnover contributions of the players of each electronic gaming machine. For example, the server may allocate a particular chance of winning that is proportional to their electronic gaming machine turnover contribution to the jackpot. The percentage chance of winning can also be seen as the drawing of numbers between one and two hundred and one where depending on the contribution of the electronic gaming machine the player will receive a particular percentage of those numbers available to be drawn. The control server 2 randomly selects a draw number from the weighted draw depending on the player's contribution. The table below illustrates this example.

| Player | No. of Chances based on Stake | Drawn Numbers to Win | Percentage chance of Winning |
|---|---|---|---|
| 1 | 45 | 1-45 | 22.39% |
| 2 | 20 | 46-65 | 9.95% |
| 3 | 1 | 66 | 0.5% |
| 4 | 10 | 67-76 | 4.98% |
| 5 | 10 | 77-86 | 4.98% |
| 6 | 10 | 87-96 | 4.98% |
| 7 | 10 | 97-106 | 4.98% |
| 8 | 5 | 108-111 | 2.49% |
| 9 | 50 | 112-161 | 24.88% |
| 10 | 10 | 162-171 | 4.98% |
| 11 | 10 | 172-181 | 4.98% |
| 12 | 10 | 182-191 | 4.98% |
| 13 | 10 | 192-201 | 4.98% |
| | 201 | | 100% |

Therefore, there is a total of 201 chances out of a total draw of 201 where, for example, if number 30 is drawn player 1 wins, number 66 means player 3 wins, number 98 or 104 means player 7 wins and number 198 means player 13 wins the jackpot, etc. A player's chances of winning are therefore proportional to the number or numbers they have in a draw.

Although not illustrated, it will be appreciated that there is also disclosed a method by which a linked progressive jackpot can be played. In this embodiment, a gaming system includes a plurality of interconnected electronic gaming machines that are configured to play a progressive linked jackpot game. The system is configured to receive input from a player of each interconnected electronic gaming machine indicative of whether to play the linked jackpot game.

The progressive linked jackpot game includes a plurality of different levels of jackpot game. The system is configured to receive input from the user of each electronic gaming machine indicative of which level of progressive linked jackpot game they play. Once selected, a predetermined percentage of a player's electronic gaming machine stake is contributed to a selected progressive linked jackpot game level where the percentage being dependent of the level.

This advantageously allows a player to select which level or levels of the jackpot to play for rather than merely being automatically allocated to a linked progressive jackpot in which the jackpot level is increased for a particular player depending on their stake. In this way, a player can select to play for the linked progressive jackpot level(s) they desire which may result in higher gaming machine turnover than lithe player cannot make the selection and they wish to play for a different jackpot level in which case they may choose not to play at all.

The foregoing describes only preferred embodiments of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game.

2. A gaining system according to claim 1 comprising one or more networks of a plurality of electronic gaming machines each having an associated interface device.

3. A gaming system according to claim 1 wherein the interface device comprises user input means to receive user input indicative of a selection in the interface device game.

4. A gaming system according to claim 1 wherein the interface device game is a game of chance, probability or skill.

5. A gaming system according to claim 2 wherein one or more of the interface devices are configured to each substantially simultaneously display an interface device game.

6. A gaming system according to claim 5 wherein users of one or more interface devices can share the interface device jackpot associated with the interface device game.

7. A gaming system according to claim 2 wherein the control server determines which interface device or devices commence the interface device game: randomly; as a function of continuous time an associated electronic gaming machine is played; as a function of the turnover of an associated electronic gaming machine; or as a function of favoured player status of the electronic gaming machine.

8. A gaming system according to claim 1 wherein operating parameters including interface device game type and interface device jackpot amount of each said interface device are remotely configurable and reconfigurable by the control server.

9. A gaming system according to claim 1 wherein each interface device communicates with the control server over a cabled or wireless network.

10. A gaming system according to claim 9 wherein the network is a wireless TCP/IP WLAN network employing encrypted internet protocol and providing two-way communications between each interface device and the control server.

11. A gaming system according to claim 10 wherein the wireless network is a secured wireless network.

12. A gaming system according to claim 1 wherein the interface device game jackpot commences at a predetermined minimum value and increments by the predetermined percentage of the turnover of each electronic gaining machine and the control server is configured to randomly generate an electronic trigger to one or more interface devices to commence the interface device game before the interface device jackpot exceeds a predetermined maximum value.

13. A gaming system according to claim 1 wherein each interface device display is configured to display a second level interface device electronic game for a second level interface device game jackpot formed from a percentage of the interface device jackpot or formed from a second level predetermined percentage of the electronic gaming machine turnover.

14. A gaming system according to claim 13 wherein the second level interface device game is commenced by either winning the interface device game or in response to a second level electronic trigger generated by the control server.

15. A gaming system according to claim 14 wherein the control server determines which interface device or devices commence the second level interface device game: randomly; as a function of continuous time an associated electronic gaming machine is played; as a function of the turnover of an associated electronic gaming machine; or as a function of favoured player status of the electronic gaming machine.

16. A gaming system according to claim 13 wherein the second level interface device game jackpot commences at a predetermined minimum value and increments by the predetermined percentage of the interface device jackpot or by the percentage of turnover of each electronic gaming machine and the control server is configured to generate the second level electronic trigger to one or more interface devices to commence the second level interface device game before the second level interface device jackpot exceeds a predetermined maximum value.

17. A gaming system according to claim 13 wherein each interface device display is configured to display a third, fourth, etc, level interface device game for a third, fourth, etc, level interface device jackpot formed from a percentage of one or more preceding level interface device jackpots, or formed from a third, fourth, etc, level predetermined percentage of the electronic gaming machine turnover.

18. A gaming system according to claim 17 wherein the third, fourth, etc, level interface device games are commenced by winning a preceding level interface device jackpot, or in response to a third, fourth, etc, level electronic trigger generated by the control server, or as selected by the user.

19. A gaming system according to claim 18 wherein the control server determines which interface device or devices commence a third, fourth, etc, level game: randomly; as a function of continuous time an associated electronic gaming machine is played; as a function of the turnover of an associated electronic gaming machine; or as a function of favoured player status of the associated electronic gaming machine.

20. A gaming system according to claim 17 wherein the third, fourth, etc, level interface device game jackpots commence at a predetermined minimum value and increments by the third, fourth, etc, level predetermined percentage of the turnover of an associated electronic gaming machine, or by a predetermined percentage of a preceding level interface device jackpot, and the control server is configured to generate third, fourth, etc, level electronic triggers to one or more of the interface devices to commence the third, fourth, etc, level interface device games before the preceding level interface device jackpot exceeds a predetermined maximum value.

21. A gaming system according to claim 1 wherein the interface devices eligible to play the interface device games arc dynamically allocatable by the control server.

22. A gaming system according to claim 13 wherein three interface devices are selected to play the interface device game and are rated first, second and third and share the secondary jackpot by some predetermined proportion.

23. A gaming system according to claim 1 wherein if an interface device game is not won by a user the amount jackpots or is distributed into one or more subsequent level interface device game jackpots.

24. A gaming system according to claim 1 wherein each interface device derives electrical power from the associated electronic gaming machine.

25. A gaming system according to claim 1 wherein each interface device is associated with an electronic gaming machine by being mounted thereto or adjacent thereto, or being disposed in an electronic gaming machine housing.

26. A gaming system according to claim 1 wherein any or part of an interface device jackpot won by a user of an interface device receives a payout independent of the associated electronic gaming device, or the player station interface device is configured to communicate with the electronic gaming machine to add a users winnings to the electronic gaming machine credit meter.

27. A gaming system according to claim 26 wherein interface device payout occurs by dispensing cash, tokens, electronic funds transfer or attendant service.

28. A gaming system according to claim 13 wherein a user may select to be eligible for inclusion in the interface device game and/or the second or subsequent level interface device game, or the control server automatically allocates a player to one or more levels of interface device game.

29. A gaming system according to claim 1 wherein each interface device is configured to read all communications from the electronic gaming machine.

30. A gaming system according to claim 1 wherein the interface device games require no user input to play.

31. A gaming system according to claim 30 wherein the interface device game is bingo or a form of race or sporting game, a card game, a table game, or other electronic game.

32. A gaming system according to claim 1 wherein the interface device games require user input.

33. A gaming system according to claim 32 wherein the interface device game is bingo or a form of a race or sporting game requiring number selection respectively, or is a table or other electronic game.

34. A gaming system according to claim 1 wherein each interface device stores graphics and audio elements associated with the interface device games.

35. A gaming system according to claim 1 wherein each interface device is configured to interface with an external device selected from the group consisting of: keyboards and input devices; magnetic and smart card readers; biometric security identification means; printers; and ancillary computing devices.

36. A gaming system according to claim 1 wherein the interface device games are displayed on each interface device and on an external visual display unit.

37. A gaming system according to claim 2 is configured to group one or more interface device games and display on each interface device the grouped interface device games and their associated jackpots and the number of interface devices participating in the interface device games.

38. A gaming system according to claim 37 and configured to allow a user to select an interface device game to compete for and apportion the predetermined percentage(s) of the electronic gaming machine to the selected interface device game jackpot.

39. A gaming system according to claim 37 and configured to allocate an interface device game to each interface device in the absence of receiving a user selection.

40. A gaming system according to claim 1, wherein the interface device games function independently of the games and payouts of associated electronic gaming machines.

41. A gaming system according to claim 1 wherein each interface device is configured to communicate data to the associated electronic gaming machine.

42. A gaming system according to claim 41 wherein the interface device is configured to adjust the credit meter of the associated electronic gaming machine.

43. A gaming system according to claim 17 wherein the player of the associated electronic gaming machine can elect which level of interface device game to play for.

44. A linked progressive jackpot gaming system comprising an electronic gaming machine having an associated player station interface device configured to monitor the turnover of the electronic gaming machine and having an interface device display configured to display an interface device electronic game wherein said interface device electronic game operates independently of games operating on the electronic gaming machine and payouts associated therewith such that a predetermined proportion of the electronic gaming machine turnover is pooled into an interface device electronic game jackpot controlled by a player station;

interface device control server operating independently of the control of the electronic gaming machine and in communication with the player station interface device wherein an electronic trigger is sent from the control server only to the player station interface device to commence an interface device game and wherein the control server is configured to provide a payout for a user winning the interface device game via the player station interface device independently of the operation of the electronic gaming machine.

45. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game;

wherein the interface device game jackpot commences at a predetermined minimum value and increments by the predetermined percentage of the turnover of each electronic gaining machine and the control server is configured to randomly generate an electronic trigger to one or more interface devices to commence the interface device game before the interface device jackpot exceeds a predetermined maximum value.

46. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game;

wherein each interface device display is configured to display a second level interface device electronic game for a second level interface device game jackpot formed from a percentage of the interface device jackpot or formed from a second level predetermined percentage of the electronic gaming machine turnover.

47. A gaming system according to claim 46 wherein the second level interface device game is commenced by either winning the interface device game or in response to a second level electronic trigger generated by the control server.

48. A gaming system according to claim 47 wherein the control server determines which interface device or devices commence the second level interface device game: randomly; as a function of continuous time an associated electronic gaming machine is played; as a function of the turnover of an associated electronic gaming machine; or as a function of favoured player status of the electronic gaming machine.

49. A gaming system according to claim 46 wherein the second level interface device game jackpot commences at a predetermined minimum value and increments by the predetermined percentage of the interface device jackpot or by the percentage of turnover of each electronic gaming machine and the control server is configured to generate the second level electronic trigger to one or more interface devices to commence the second level interface device game before the second level interface device jackpot exceeds a predetermined maximum value.

50. A gaming system according to claim 46 wherein each interface device display is configured to display a third, fourth, etc, level interface device game for a third, fourth, etc, level interface device jackpot formed from a percentage of one or more preceding level interface device jackpots, or formed from a third, fourth, etc, level predetermined percentage of the electronic gaming machine turnover.

51. A gaming system according to claim 50 wherein the third, fourth, etc, level interface device games are commenced by winning a preceding level interface device jackpot, or in response to a third, fourth, etc, level electronic trigger generated by the control server, or as selected by the user.

52. A gaming system according to claim 51 wherein the control server determines which interface device or devices commence a third, fourth, etc, level game: randomly; as a function of continuous time an associated electronic gaming machine is played; as a function of the turnover of an associated electronic gaming machine; or as a function of favoured player status of the associated electronic gaming machine.

53. A gaming system according to claim 50 wherein the third, fourth, etc, level interface device game jackpots commence at a predetermined minimum value and increments by the third, fourth, etc, level predetermined percentage of the turnover of an associated electronic gaming machine, or by a predetermined percentage of a preceding level interface device jackpot, and the control server is configured to generate third, fourth, etc, level electronic triggers to one or more of the interface devices to commence the third, fourth, etc, level interface device games before the preceding level interface device jackpot exceeds a predetermined maximum value.

54. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game;

wherein each interface device display is configured to display a second level interface device electronic game for a second level interface device game jackpot formed from a percentage of the interface device jackpot or formed from a second level predetermined percentage of the electronic gaming machine turnover;

wherein three interface devices are selected to play the interface device game and are rated first, second and third and share the secondary jackpot by some predetermined proportion.

55. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game;

wherein each interface device display is configured to display a second level interface device electronic game for a second level interface device game jackpot formed from a percentage of the interface device jackpot or formed from a second level predetermined percentage of the electronic gaming machine turnover;

wherein a user may select to be eligible for inclusion in the interface device game and/or the second or subsequent level interface device game, or the control server automatically allocates a player to one or more levels of interface device game.

56. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game;

one or more networks of a plurality of electronic gaming machines each having an associated interface device;

configured to group one or more interface device games and display on each interface device the grouped interface device games and their associated jackpots and the number of interface devices participating in the interface device games;

configured to allow a user to select an interface device game to compete for and apportion the predetermined percentage(s) of the electronic gaming machine to the selected interface device game jackpot.

57. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game;

one or more networks of a plurality of electronic gaming machines each having an associated interface device;

configured to group one or more interface device games and display on each interface device the grouped interface device games and their associated jackpots and the number of interface devices participating in the interface device games;

configured to allocate an interface device game to each interface device in the absence of receiving a user selection.

58. A linked progressive jackpot gaming system comprising:

a player station interface device configured to be associated with an electronic gaming machine and monitor turnover thereof and communicate the turnover to a player station interface device control server operating independently of the control of the electronic gaming machine;

an interface device display configured to display an interface device electronic game wherein said interface device electronic game operates independently of games operating on the electronic gaming machine and payouts associated therewith;

wherein a predetermined percentage of the electronic gaming machine turnover is pooled into an interface device game jackpot controlled by the control server which generates an electronic trigger for the interface device to commence an interface device electronic game, and via the interface device independently of the operation of the electronic gaming machine the interface device provides a payout of part or all of the interface device game jackpot to the user of the interface device if they win the interface device game;

wherein each interface device display is configured to display a second level interface device electronic game for a second level interface device game jackpot formed from a percentage of the interface device jackpot or formed from a second level predetermined percentage of the electronic gaming machine turnover;

wherein each interface device display is configured to display a third, fourth, etc, level interface device game for a third, fourth, etc, level interface device jackpot formed from a percentage of one or more preceding level interface device jackpots, or formed from a third, fourth, etc, level predetermined percentage of the electronic gaming machine turnover;

wherein the player of the associated electronic gaming machine can elect which level of interface device game to play for.

* * * * *